United States Patent [19]
Lupke

[11] 3,981,663
[45] Sept. 21, 1976

[54] APPARATUS FOR MAKING HIGH SPEED CORRUGATED PLASTIC TUBING

[76] Inventor: Gerd P.H. Lupke, 46 Stornoway Crescent, Thornhill, Ontario, Canada, L3T 3X7

[22] Filed: Oct. 7, 1974

[21] Appl. No.: 512,231

Related U.S. Application Data

[63] Continuation-in-part of Ser. No. 396,100, Sept. 10, 1973, abandoned.

[52] U.S. Cl. .......................... 425/326 B; 425/371; 425/387 B; 425/396; 425/DIG. 206; 425/DIG. 208
[51] Int. Cl.² .......................................... B29F 3/08
[58] Field of Search ............ 425/326 B, 387 B, 392, 425/72, 371, 384, 396, 394, DIG. 206, DIG. 203, DIG. 211, 133.1, 505, 112

[56] References Cited
UNITED STATES PATENTS

| | | | |
|---|---|---|---|
| 2,035,188 | 3/1936 | Quick | 425/371 |
| 2,365,804 | 12/1944 | Clerke | 425/371 |
| 2,460,566 | 1/1949 | Brown et al. | 425/371 |
| 3,188,690 | 6/1965 | Zieg | 425/396 |
| 3,280,430 | 10/1966 | Antrobus | 425/387 |
| 3,286,305 | 11/1966 | Seckel | 425/396 |
| 3,430,292 | 3/1969 | Bauman et al. | 425/183 |
| 3,488,809 | 1/1970 | James | 425/384 |
| 3,677,676 | 7/1972 | Hegler | 425/112 |
| 3,705,779 | 12/1972 | Zon | 425/370 |
| 3,743,456 | 7/1973 | Cini | 425/133.1 |
| 3,751,541 | 8/1973 | Hegler | 425/396 |
| 3,764,250 | 10/1973 | Waterloo | 425/384 |
| 3,832,429 | 8/1974 | Charpentier | 425/371 |
| 3,835,209 | 9/1974 | Karabedian | 425/384 |
| 3,836,298 | 9/1974 | Ernst | 425/371 |
| 3,885,901 | 5/1975 | Reiners | 425/371 |

*Primary Examiner*—Francis S. Husar
*Assistant Examiner*—Carl Rowold

[57] ABSTRACT

A high speed corrugator for producing corrugated thermoplastic tubing comprises a pair of complementary upper and lower mold assemblies each comprising an endless chain of articulately interconnected mold blocks and means for guiding the mold blocks along an endless track having a forward run and a return run, each mold block being complimentary to a respective mold block of the other assembly, the mold blocks co-operating in pairs along said forward run to form an axially extending tunnel defining a tubular mold having a corrugated wall. The mold assemblies are positioned so as to locate the extrusion head at the entrance to the tunnel coaxially therewith, and extruded thermoplastic material is expanded by blow molding to conform to the interior surface of the mold. Cooling air is fed along an air distributor duct extending along the tunnel for cooling the molded thermoplastic, the cooling air being divided from the blow molding air by a baffle. Each mold assembly further comprises an air distributing duct extending along the return run of the endless track and positioned to distribute cooling air to the exposed interior faces of the mold blocks.

14 Claims, 12 Drawing Figures

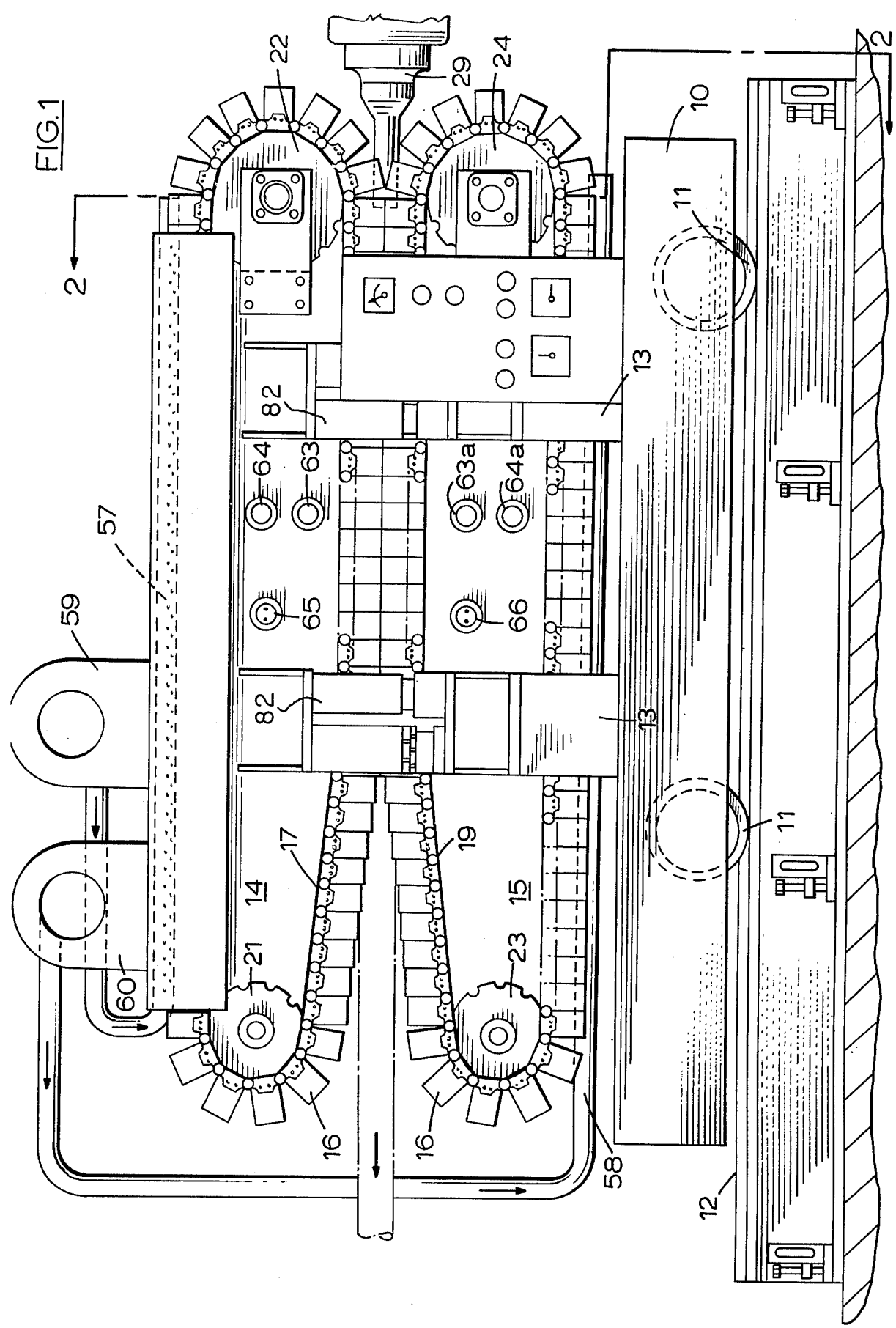

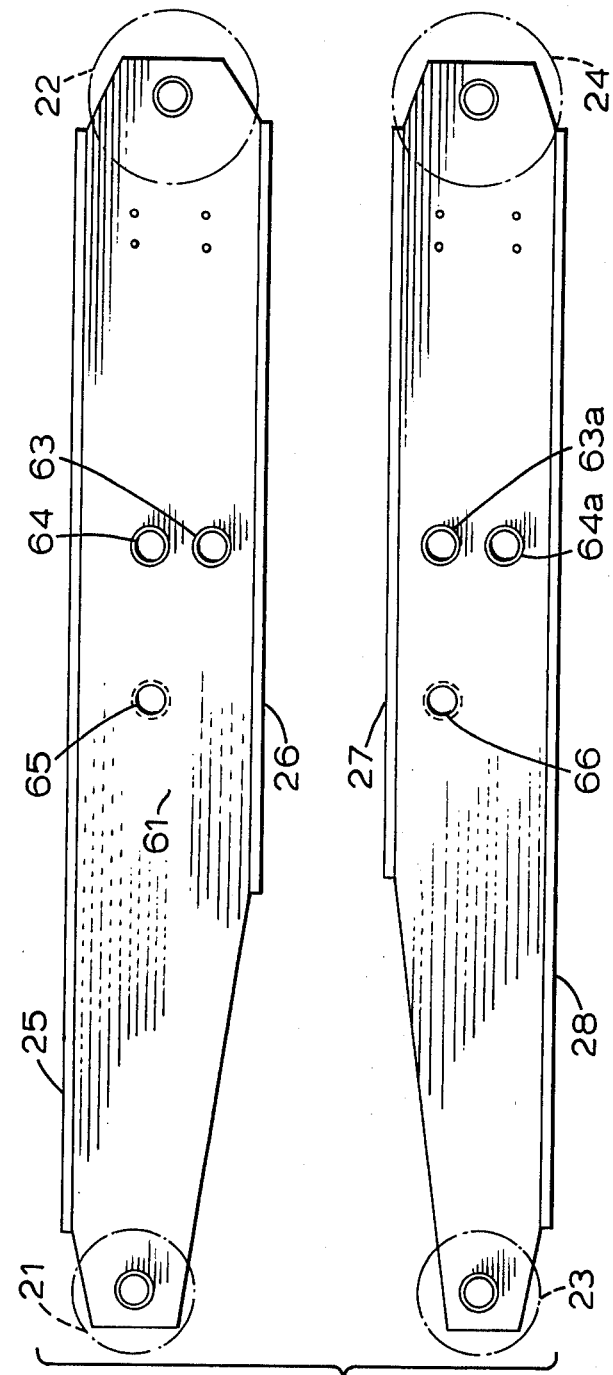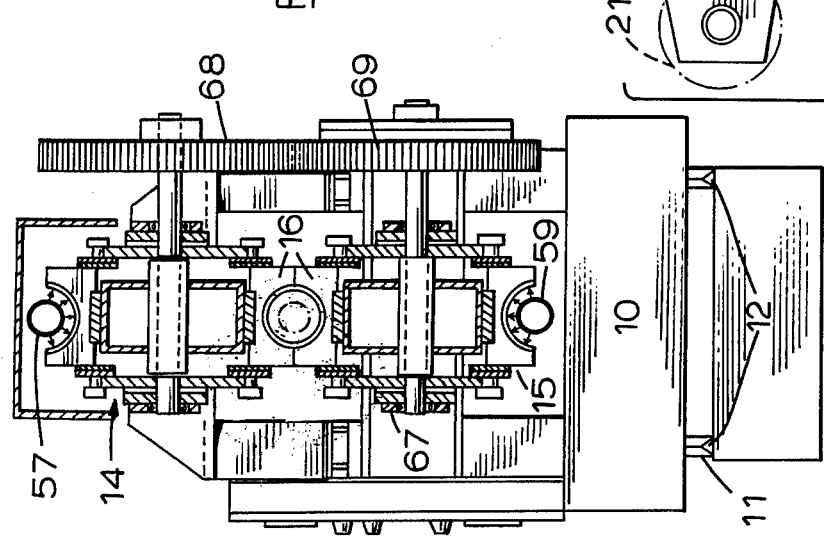

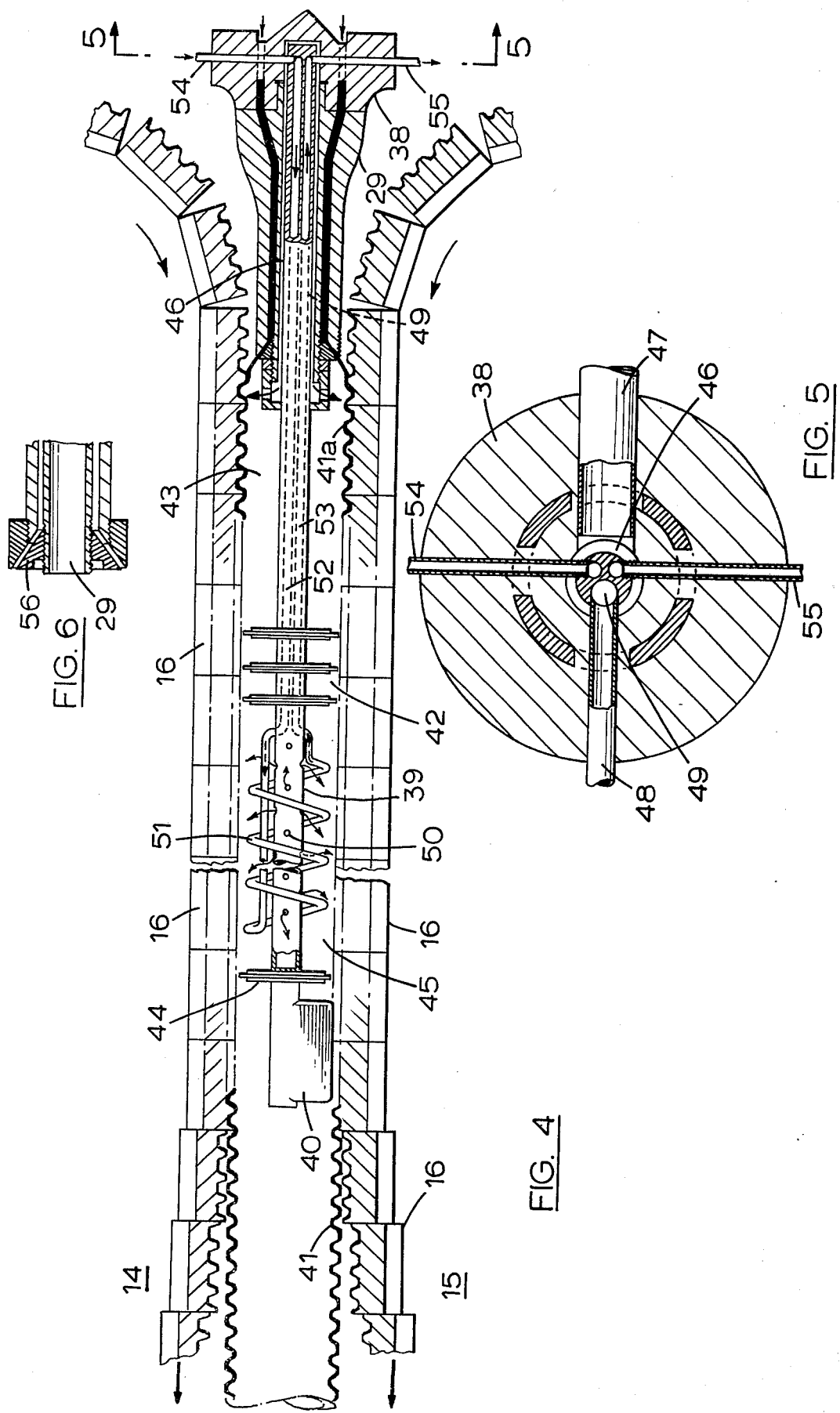

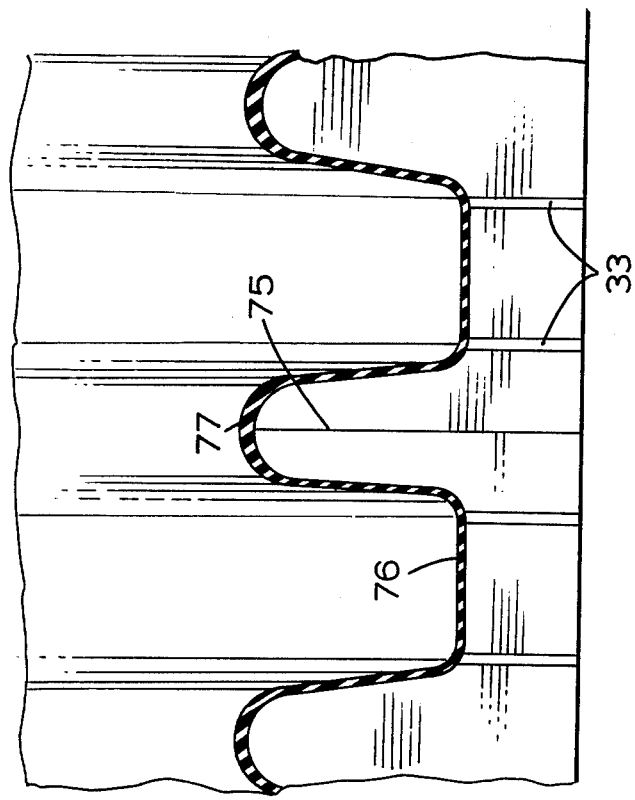
FIG. 9
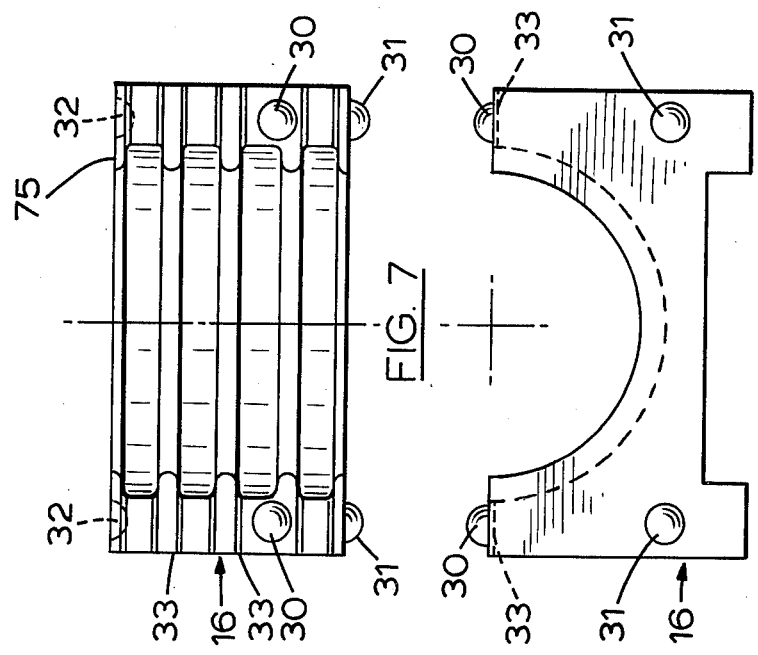
FIG. 7
FIG. 8

APPARATUS FOR MAKING HIGH SPEED CORRUGATED PLASTIC TUBING

CROSS-REFERENCE TO RELATED APPLICATION

This application is a continuation-in-part of my co-pending application Ser. No. 396,100, filed Sept. 10, 1973 for "Apparatus for Making High Speed Corrugated Plastic Tubing," now abandoned.

This invention relates to a high speed corrugating apparatus for the production of corrugated thermoplastic tubing. The apparatus is of the type in which a continuously extruded tube of the thermoplastic material is expanded by blow molding within a tubular mold, the mold being formed by cooperating mold blocks which are moved progressively as the tube is extruded.

Present corrugators of this type are very limited as to their speed of operation, the size of tubing which can be produced in this way, and also the quality of tubing so produced. The principal limiting factor is the rate at which the molded tubing can be cooled from the plastic state to a temperature at which it can safely be disengaged from the mold. The present methods of cooling are quite inadequate for high speed, high quality, tubing production.

It is the main object of the present invention to provide a corrugating apparatus of the type referred to with cooling means whereby to effect more rapid cooling of the molded thermoplastic material than has been possible hitherto. This object is achieved primarily by providing an air distributing duct which extends axially along the tubular mold for distributing cooling air to the interior surface of the molded thermoplastic material within the mold, the duct being associated with baffle means for dividing the cooling air from the pressurized air used to effect the blow molding of the material. Preferably, additional cooling devices are incorporated in the apparatus for cooling the mold blocks.

In order that the invention may be readily understood, one embodiment thereof will now be described by way of example with reference to the accompanying drawings, in which:

FIG. 1 is a side elevational view of a high speed corrugator in accordance with the invention;

FIG. 2 is a section on line 2—2 in FIG. 1;

FIG. 3 is a fragmentary side view illustrating mold block housings and associated guide means;

FIG. 4 is a longitudinal sectional view of a detail of the apparatus, showing internal cooling means;

FIG. 5 is a section on line 5—5 in FIG. 4;

FIG. 6 illustrates in section an adaptor for varying the extrusion rate;

FIG. 7 is a top plan view of a mold block;

FIG. 8 is an end view of a mold block;

FIG. 9 is an enlarged plan view of a detail of the mold block, showing variations in thickness of the molded thermoplastic material;

Figure 10:
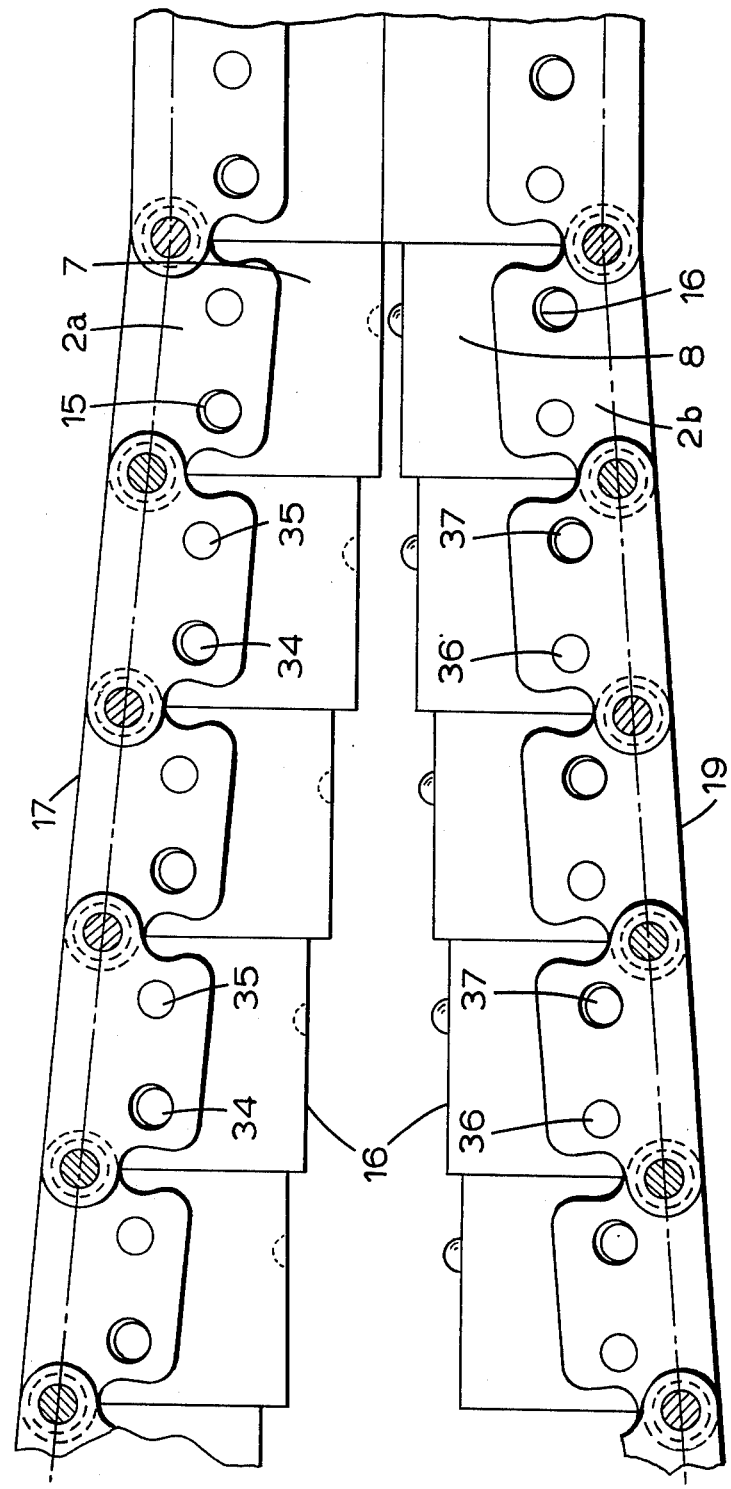
FIG. 10 illustrates a detail of the complementary mold assemblies.
Figures 11, 12:
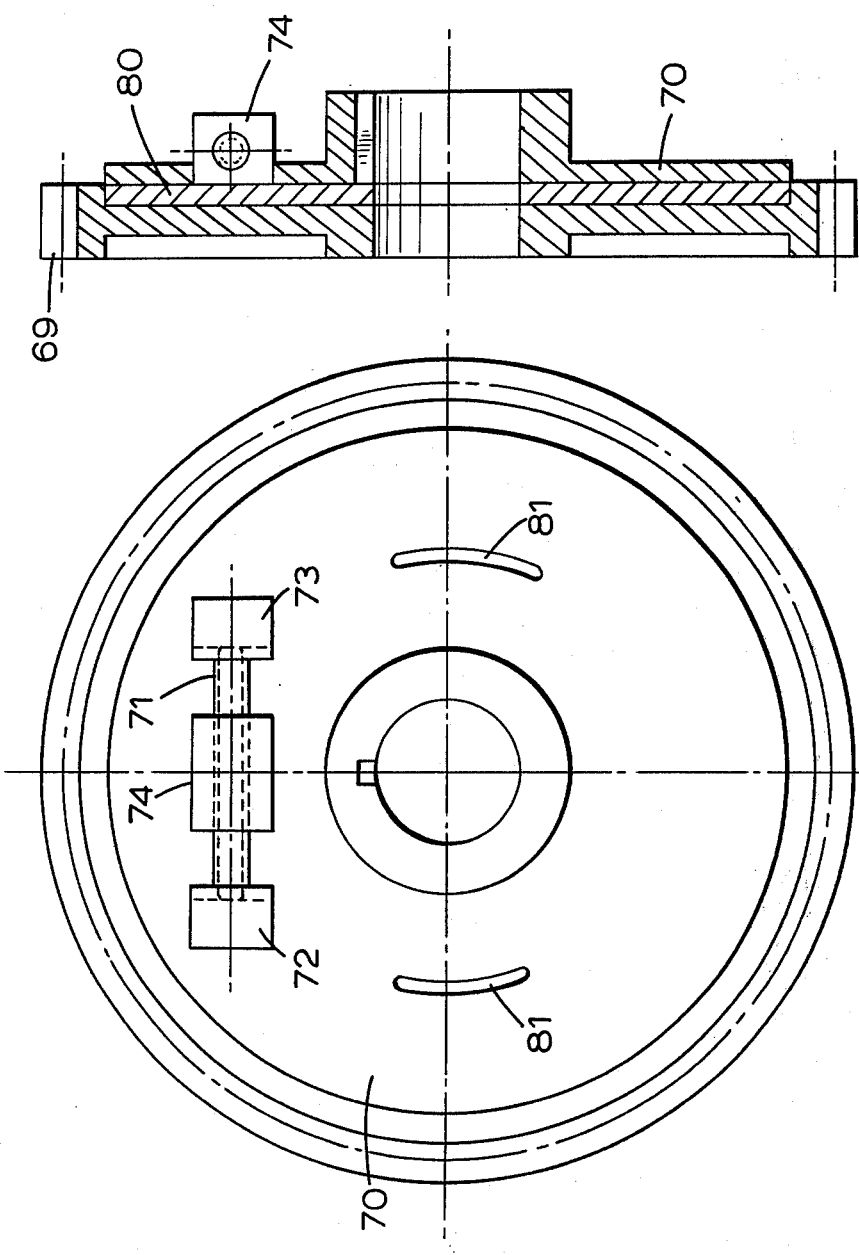
FIGS. 11 and 12 are a side view and a sectional view, respectively, of a timing device for adjusting the relative positions of the complementary mold assemblies.

Referring to the drawings, and more particularly FIGS. 1 and 2, the corrugator comprises a wheeled structure including a carriage 10 mounted on wheels 11 which run on tracks 12. A support structure 13 mounted on the carriage 10 supports a pair of complementary upper and lower mold assemblies 14, 15. Each mold assembly comprises an endless chain of mold blocks 16, which are articulately interconnected, each mold block extending transversely between opposite links of a pair of endless conveyor chains 17, 18 (and 19, 20) as shown in FIG. 2. The chains extend round drive sprockets 21, 22 and 23, 24 (FIGS. 1, 2 and 3) and are guided for movement along endless tracks defined by the drive sprockets and respective guide rails 25, 26, and 27, 28. Each mold block 16 is complementary to a respective mold block of the other mold assembly, the mold blocks cooperating in pairs along the forward run to form an axially extending tunnel defining a tubular mold having a corrugated wall. The chains of mold blocks are driven in synchronism with one another by the driven sprockets so that as the mold blocks circulate along the endless tracks the wall of the tubular wall moves along with the plastic molded thereby. By means of the wheeled carriage 10, the mold assemblies can be positioned so as to locate an extrusion head 29 at the entrance to the tunnel formed by the cooperating mold blocks, the extrusion head being fitted to the nozzle of an extrusion machine as arranged coaxially with the tunnel. When required, the mold assemblies can be backed away from the extrusion head to provide access to the latter.

The form of the mold blocks is best seen in FIGS. 7, 8 and 9. Each block is of generally rectangular shape having a pair of end faces, side and bottom faces, and a top face which is formed with a hemicylindrical recess contoured to provide a corrugated mold wall. The top face of the block 16 shown in FIGS. 7 and 8 is formed with a pair of pins 30, one on each side of the recess, which are adapted to register with sockets on the complementary top face of a cooperating block to maintain alignment between the blocks. The end faces of each block may be formed with complementary pins 31 and sockets 32 so as further to assist alignment of the blocks. The latter pins and sockets may be omitted; however, if provided the pins must be retracted from the sockets in order to permit disengagement of the blocks at the end of the forward run. This is preferably accomplished by having the pins 31 spring-biassed towards the retracted position, and actuated by cam means which engage the guide rails.

The mold blocks of each complementary pair are formed with respective cooperating grooves 33, which register so as to define passages for the escape of entrapped air from the mold blocks along the forward run.

Referring now to FIG. 10, the sides of the mold blocks are pivotally connected to the endless conveyor chains 17, 18 (19, 20) by respective leading and trailing pivotal connections 34, 35, and 36, 37. The leading pivotal connections 34 of the mold blocks of the upper mold assembly 14 provide a degree of vertical lost motion, the pivot pins engaging in vertically elongated apertures as shown; the trailing pivotal connections 37 of the mold blocks of the lower mold assembly similarly provide a degree of vertical lost motion. In this way, the blocks are permitted to separate at the end of the forward run without changing the relative orientations of the blocks. By maintaining the relative orientations of the blocks until they have completely separated, as shown in FIG. 1, pinching of the molded thermoplastic material is avoided.

The extrusion head 29 is adapted to be fitted to the nozzle of a standard extrusion machine. However, the extrusion head itself is specially adapted for use with the present apparatus. Referring to FIGS. 4 and 5, in which the extrusion head is positioned at the entrance to the tunnel formed by the cooperating mold blocks, it will be seen that the head has an adaptor portion 38 provided with a plurality of radial fluid connections. Connected to the extrusion head and extending axially therefrom is a tubular member 39, having a rider 40 at its free end which rests on the internal surface of the molded tubing 41 to support that end. The tubular member 39 carries a first baffle means constituted by three annular seals 42, which are spaced axially from the end of the extrusion head 29 to define a first air space 43 therewith, and second baffle means constituted by an annular seal 44 which is spaced from the first baffle means to define a second air space 45 therewith. The extrusion head includes a first air duct 46 which communicates with a first air inlet 47 by which pressurized air is fed to the duct. The air duct opens into the air space 43 so as to introduce the pressurized air by which the hot extruded tube 41a of thermoplastic material is expanded into molding engagement with the wall of the mold. A second air inlet 48 communicates with an air duct 49 extending within the tubular member 39 and communicating with the air space 45. The tubular member 39 has openings 50 distributed along its length within the air space 45, so that cooling air fed to the second air inlet 48 is discharged onto the thermoplastic material after it has been molded for cooling and setting the material. To assist cooling of this cooling air, a heat exchanger coil 51 is mounted on the tubular member and communicates with a pair of ducts 52, 53 extending within the tubular member, inlet and outlet connections 54, 55 for cooling fluid being connected to these ducts.

FIG. 6 illustrates an adaptor 56 having an inner and an outer collar which may be threaded into the end of the extrusion head 29 when required, the inner and outer collars defining a conical slot communicating with the passage in the head by which the plastic material is extruded. The inner and outer collars can be relatively adjusted for varying the rate of extrusion of thermoplastic material.

As shown in FIGS. 1 and 2, each mold assembly further comprises an air distributing duct 57, 58 extending along the return run of the respective endless track and positioned to distribute cooling air to the exposed interior surfaces of the mold blocks as they travel along the return run. The distributing ducts 57, 58 are connected to respective blowers 59, 60 by which the cooling air is supplied to them. Each mold assembly further comprises a heat sink provided by a tank 61, 62 through which cooling water may be circulated, inlet and outlet water connections 63, 64 and 63a, 64a being shown. The mold assembly housings may be cooled in this way during a molding operation; however, in order to avoid wastage of material at the commencement of a molding operation, the water in the housings may be preheated to the required temperature by electrical immersion heaters mounted in the walls of the housings as shown at 65, 66.

Since standard chain and sprocket drives are used for the upper and lower mold assemblies, it is necessary to ensure that the pairs of cooperating mold blocks line up precisely. This is achieved by means of a timing device 67 consisting of an upper spur gear 68 which is rigidly coupled to the drive shaft of the upper assembly, and a lower spur gear 69 which can be allowed to run freely on the drive shaft of the lower assembly. The spur gear 69 is attached to a plate 70 which is rigidly coupled to the lower drive mechanism. A threaded shaft 71 extending between bearings 72, 73 mounted on the plate 70 engages a threaded block 74 mounted on an intermediate plate 80 which is fixed to the spur gear and can be locked to the plate 70 by a locking device 81. By rotating the shaft 71, the relative angular positions of the spur gears in relation to their respective drive shafts can be relatively adjusted.

A subsidiary feature of the invention, as illustrated in FIGS. 7, 8 and 9, is that the mold blocks are shaped so that the joints 75 between adjacent pairs of mold blocks are positioned at the valleys of the formed tubing instead of at the ridges 76 as is the conventional practice. The extrusion head forms a uniform tube of the thermoplastic material which when expanded by air pressure conforms to the profile of the tubular mold. This results in a material thickness distribution as shown at 77 in FIG. 9, the material being thickest at the valleys. Thus, any slight offset or misalignment between the mold blocks will have a minimal effect on on the the strength and flexibility of the product.

A further subsidiary feature of the invention, as illustrated in FIG. 1, is that the support structure 13 includes mechanical jacks 82 interconnecting the upper and lower mold assemblies and operable for raising the upper assembly from the lower, when required, to permit easy access for servicing.

What I claim as my invention is:

1. A high speed corrugator for producing corrugated thermoplastic tubing, comprising:
    a pair of complementary mold assemblies each comprising an endless chain of articulately interconnected mold blocks and means for guiding the mold blocks along an endless track having a forward run and a return run,
    each mold block being complementary to a respective mold block of the other assembly, said mold blocks cooperating in pairs along said forward run to form an axially extending tunnel defining a tubular mold having a corrugated wall,
    means associated with said assemblies for driving said endless chains in synchronism for progressively moving the mold blocks along said endless tracks,
    an extrusion head adapted to be fitted to the nozzle of an extrusion machine for forming a tube of thermoplastic material therefrom,
    means positioning the mold assemblies so as to locate the extrusion head at the entrance to said tunnel coaxially therewith,
    said extrusion head including first duct means for introducing pressurized air to the interior of the extruded tube for expanding the tube to conform to the wall of the tubular mold, and second duct means separate of said first duct means for the passage of cooling air,
    baffle means spaced axially from the extrusion head for maintaining a pressurized air space between said baffle means and the extrusion head, and
    an air distributing duct communicating with said second duct means, the air distributing duct extending axially along said tunnel beyond said baffle means for distributing cooling air to the interior of the molded thermoplastic material within said tubular mold.

2. A high speed corrugator according to claim 1, wherein each mold assembly further comprises a second air distributing duct extending along the return run of the respective endless track and positioned to distribute cooling air to the exposed interior faces of the mold blocks therealong, the corrugator further including blower means connected to said second air distributor ducts for supplying cooling air thereto.

3. A high speed corrugator according to claim 1, wherein each mold block extends transversely between a pair of endless conveyor chains to which it is pivotally connected by respective leading and trailing pivot connections, the leading pivotal connections of the mold blocks of the upper assembly and the trailing pivotal connections of the mold blocks of the lower assembly providing a degree of vertical lost motion whereby to permit separation of the blocks at the end of the forward run without changing the relative orientations of the blocks.

4. A high speed corrugator according to claim 3, wherein the mold blocks of each complementary pair are formed respectively with registering pins and sockets adapted to interengage to maintain said pair of blocks in mutual alignment.

5. A high speed corrugator according to claim 3, wherein the mold blocks of each complementary pair are formed respectively with cooperating grooves which, along the forward run, define passages for the escape of entrapped air.

6. A high speed corrugator according to claim 1, wherein the mold assemblies are mounted on a wheeled structure running on tracks for guiding the mold assemblies to and from an operative position at which the extrusion head is located at the entrance to said tunnel.

7. A high speed corrugator according to claim 6, wherein the wheeled structure includes mechanical jacks for raising and lowering the upper assembly from and to the lower assembly.

8. A high speed corrugator according to claim 1, further comprising a heat exchange coil cooperating with the air distributing duct, the heat exchange coil being positioned to intercept said cooling air, said extrusion head providing coolant connections communicating with said heat exchange coil for supplying coolant therethrough.

9. A high speed corrugator for producing corrugated thermoplastic tubing, comprising: a pair of complementary upper and lower mold assemblies each comprising an endless chain of articulately interconnected mold blocks and means for guiding the mold blocks along an endless track having a forward run and a return run, each mold block being complementary to a respective mold block of the other assembly, said mold blocks cooperating in pairs along said forward run to form an axially extending tunnel defining a tubular mold having a corrugated wall,
  each mold assembly further comprising an air distributing duct extending along the return run of the endless track and positioned to distribute cooling air to the exposed interior faces of the mold blocks therealong,
  blower means connected to said air distributor ducts for supplying cooling air thereto,
  means associated with said assemblies for driving the endless chains in synchronism for progressively moving the mold blocks along said endless tracks,
  an extrusion head adapted to be fitted to the nozzle of an extrusion machine for forming a tube of thermoplastic material therefrom,
  means positioning the mold assemblies so as to locate the extrusion head at the entrance to said tunnel coaxially therewith,
  a tubular member connected to and extending axially from the extrusion head along said tunnel,
  first baffle means mounted on the tubular member and defining with the extrusion head a first air space,
  second baffle means mounted on the tubular member and spaced axially from the first baffle means to define therewith a second air space,
  said extrusion head including first air duct means for introducing pressurized air to the first air space for expanding the extruded tube of thermoplastic material to conform to the wall of the tubular mold,
  and said tubular member including second air duct means separate of first air duct means for introducing cooling air to the second air space for cooling the molded thermoplastic material within said tubular mold.

10. A high speed corrugator according to claim 9, further comprising a heat exchange coil mounted on the tubular member between said first and second baffle means, the heat exchange coil communicating with duct means extending along said tubular member for supplying cooling fluid through the heat exchange coil.

11. A high speed corrugator according to claim 10, wherein each mold assembly further provides a heat sink disposed in heat exchange relation with the mold blocks, and means for adjusting the temperature of the heat sink for preheating or cooling the mold blocks.

12. A high speed corrugator according to claim 10, wherein the extrusion head includes an adaptor block providing a plurality of fluid connections, said fluid connections comprising a first air inlet communicating with said air duct means for introducing pressurized air, a second air inlet communicating with said air duct means for introducing cooling air, and inlet and outlet connections communicating with said duct means for supplying cooling fluid through the heat exchange coil.

13. An extrusion head for use in combination with a corrugator for the continuous production of corrugated thermoplastic tubing, the corrugator providing a tubular mould into which a tube of thermoplastic material is extruded and expanded by blow moulding to conform to the mould, the extrusion head being adapted to be fitted to the nozzle of an extrusion machine and comprising:
  a tubular body providing an annular passage for the extrusion of said material and terminating in an annular orifice,
  a tubular member mounted within the tubular body and extending axially therefrom,
  a first baffle member mounted on the tubular member and spaced axially from said orifice,
  a second baffle member mounted on the tubular member and spaced axially from the first baffle member,
  the tubular body providing a first air duct terminating at an opening between said orifice and the first baffle member,
  the tubular member defining a second air duct terminating at a plurality of openings distributed axially along the tubular member at positions between said first and second baffle members,
  the extrusion head further including an adaptor block providing a first air inlet communicating with the first air duct for introducing pressurized air thereto, and a second air inlet communicating with the second air duct for introducing cooling air thereto.

14. An extrusion head as claimed in claim 13, further comprising a heat exchange coil mounted on the tubular member between said first and second baffle members, the heat exchange coil communicating with fluid duct means extending longitudinally within the tubular member for supplying cooling fluid, and the adaptor block further providing inlet and outlet connections communicating with the fluid duct means for supplying cooling fluid through the heat exchange coil.

* * * * *